US006249834B1

(12) United States Patent
Henderson et al.

(10) Patent No.: US 6,249,834 B1
(45) Date of Patent: Jun. 19, 2001

(54) SYSTEM FOR EXPANDING PCI BUS LOADING CAPACITY

(75) Inventors: Michael G. Henderson, San Jose; Carlton G. Amdahl; Dennis H. Smith, both of Fremont; Don Agneta, Hill, all of CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 08/942,404

(22) Filed: Oct. 1, 1997

Related U.S. Application Data

(60) Provisional application No. 60/047,016, filed on May 13, 1997, provisional application No. 60/046,416, filed on May 13, 1997, provisional application No. 60/047,003, filed on May 13, 1997, provisional application No. 60/046,490, filed on May 13, 1997, provisional application No. 60/046,398, filed on May 13, 1997, and provisional application No. 60/046,312, filed on May 13, 1997.

(51) Int. Cl.[7] ........................................................ G06F 13/00
(52) U.S. Cl. .................. 710/129; 710/126; 710/128; 710/260; 710/103; 713/400
(58) Field of Search ............................ 395/309; 710/103, 710/128, 129, 126, 260; 713/400

(56) References Cited

U.S. PATENT DOCUMENTS

| 4,057,847 | 11/1977 | Lowell et al. ........................ 364/200 |
| 4,100,597 | 7/1978 | Fleming et al. ...................... 364/474 |
| 4,449,182 | 5/1984 | Rubinson et al. . | |

(List continued on next page.)

FOREIGN PATENT DOCUMENTS

| 0 866 403 A1 | 9/1988 | (EP) . | |
| 04 333 118 | 11/1992 | (JP) | ................................ G06F/1/18 |
| 05 233 110 | 9/1993 | (JP) | ................................ G06F/3/00 |
| 07 093 064 | 4/1995 | (JP) | ................................ G06F/1/26 |
| 07 261 874 | 10/1995 | (JP) | ................................ G06F/1/18 |

OTHER PUBLICATIONS

Shanley and Anderson, PCI System Architecture, Third Edition, Chapters 15 & 16, pp. 297–328, CR 1995.
PCI Hot–Plug Specification, Preliminary Revision for Review Only, Revision 0.9, pp. i–vi, and 1–25, Mar. 5, 1997.
SES SCSI–3 Enclosure Services, X3T10/Project 1212–D/ Rev 8a, pp. i, iii–x, 1–76, and 1–1 (index), Jan. 16, 1997.
Compaq Computer Corporation, Technology Brief, pp. 1–13, Dec. 1996, "Where Do I Plug the Cable? Solving the Logical–Physical Slot Numbering Problem."
Standard Overview, http://www.pc–card.com/stand_overview.html#1, 9 pages, Jun. 1990, "Detailed Overview of the PC Card Standard."
Digital Equipment Corporation, datasheet, 140 pages, 1993, "DECchip 21050 PCI–To–PCI Bridge."
NetFrame Systems Incorporated, News Release, 3 pages, referring to May 9, 1994, "NetFrame's New High–Availability ClusterServer Systems Avoid Scheduled as well as Unscheduled Downtime."

(List continued on next page.)

Primary Examiner—Rupal Dharia
(74) Attorney, Agent, or Firm—Knobbe, Martens, Olson & Bear, LLP (57) ABSTRACT

A system for expanding the loading capacity of a PCI bus in an information processing system having a multiple bus architecture. In one embodiment, the system comprises a processor-to-PCI bridge connected to a plurality of PCI-to-PCI bridges to generate multiple PCI buses. A plurality of add-in board connectors are coupled to each of the generated PCI buses. In another embodiment, the system comprises two or more processor-to-PCI bridges connected to a plurality of PCI-to-PCI bridges to generate multiple PCI buses. The resulting system expands the loading capacity of a PCI bus while adding resistance to single point failures.

22 Claims, 3 Drawing Sheets

U.S. PATENT DOCUMENTS

| | | | |
|---|---|---|---|
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. . | |
| 4,769,764 | 9/1988 | Levanon | 364/708 |
| 4,774,502 | 9/1988 | Kimura | 340/501 |
| 4,821,180 | 4/1989 | Gerety et al. | 364/200 |
| 4,835,737 | 5/1989 | Herrig et al. . | |
| 4,894,792 | 1/1990 | Mitchell et al. | 364/708 |
| 4,949,245 | 8/1990 | Martin et al. . | |
| 4,999,787 | 3/1991 | McNally et al. . | |
| 5,006,961 | 4/1991 | Monico . | |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,123,017 | 6/1992 | Simpkins et al. | 371/15.1 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,157,663 | 10/1992 | Major et al. | 371/9.1 |
| 5,210,855 | 5/1993 | Bartol . | |
| 5,222,897 | 6/1993 | Collins et al. | 439/157 |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,261,094 | 11/1993 | Everson et al. | 395/600 |
| 5,265,098 | 11/1993 | Mattson et al. | 371/11.1 |
| 5,266,838 | 11/1993 | Gerner | 307/19 |
| 5,269,011 | 12/1993 | Yanai et al. . | |
| 5,272,382 | 12/1993 | Heald et al. | 307/66 |
| 5,272,584 | 12/1993 | Austruy et al. . | |
| 5,276,814 * | 1/1994 | Bourke et al. | 710/105 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,307,354 | 4/1994 | Cramer et al. . | |
| 5,311,397 | 5/1994 | Harshberger et al. | 361/683 |
| 5,311,451 | 5/1994 | Barrett | 364/550 |
| 5,317,693 | 5/1994 | Cuenod et al. . | |
| 5,329,625 | 7/1994 | Kannan et al. . | |
| 5,337,413 | 8/1994 | Lui et al. . | |
| 5,351,276 | 9/1994 | Doll, Jr. et al. . | |
| 5,367,670 | 11/1994 | Ward et al. | 395/575 |
| 5,379,184 | 1/1995 | Barraza et al. | 361/685 |
| 5,379,409 | 1/1995 | Ishikawa | 395/575 |
| 5,386,567 | 1/1995 | Lien et al. . | |
| 5,388,267 | 2/1995 | Chan et al. | 395/700 |
| 5,402,431 | 3/1995 | Saadeh et al. | 371/67.1 |
| 5,404,494 | 4/1995 | Garney . | |
| 5,423,025 | 6/1995 | Goldman et al. | 395/575 |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,440,748 | 8/1995 | Sekine et al. . | |
| 5,448,723 | 9/1995 | Rowett | 395/200.02 |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,471,617 | 11/1995 | Farrand et al. | 395/700 |
| 5,471,634 | 11/1995 | Giorgio et al. | 395/600 |
| 5,473,499 | 12/1995 | Weir | 361/58 |
| 5,483,419 | 1/1996 | Kaczeus, Sr. et al. . | |
| 5,485,550 | 1/1996 | Dalton | 395/51 |
| 5,485,607 | 1/1996 | Lomet et al. | 395/600 |
| 5,487,148 | 1/1996 | Komori et al. . | |
| 5,491,791 | 2/1996 | Glowny et al. . | |
| 5,493,574 | 2/1996 | McKinley . | |
| 5,493,666 | 2/1996 | Fitch . | |
| 5,513,314 | 4/1996 | Kandasamy et al. | 395/182.04 |
| 5,513,339 | 4/1996 | Agrawal et al. | 395/500 |
| 5,515,515 | 5/1996 | Kennedy et al. | 395/283 |
| 5,517,646 | 5/1996 | Piccirillo et al. . | |
| 5,519,851 | 5/1996 | Bender et al. | 395/500 |
| 5,526,289 | 6/1996 | Dinh et al. | 364/557 |
| 5,528,409 | 6/1996 | Cucci et al. | 359/171 |
| 5,530,810 | 6/1996 | Bowman | 395/283 |
| 5,533,193 | 7/1996 | Roscoe | 395/183.15 |
| 5,533,198 | 7/1996 | Thorson | 395/200.15 |
| 5,535,326 | 7/1996 | Baskey et al. | 395/182.02 |
| 5,539,883 | 7/1996 | Allon et al. | 395/200.11 |
| 5,542,055 * | 7/1996 | Amini et al. | 395/281 |
| 5,546,272 | 8/1996 | Moss et al. | 361/687 |
| 5,548,712 | 8/1996 | Larson et al. | 395/182.05 |
| 5,555,510 | 9/1996 | Verseput et al. . | |
| 5,559,764 | 9/1996 | Chen et al. | 396/30 |
| 5,559,958 | 9/1996 | Farrand et al. | 395/183.03 |
| 5,559,965 | 9/1996 | Oztaskin et al. . | |
| 5,560,022 | 9/1996 | Dunstan et al. | 395/750 |
| 5,564,024 | 10/1996 | Pemberton . | |
| 5,566,299 | 10/1996 | Billings et al. | 395/182.02 |
| 5,566,339 | 10/1996 | Perholtz et al. | 395/750 |
| 5,568,610 | 10/1996 | Brown . | |
| 5,568,619 * | 10/1996 | Blackledge et al. | 395/281 |
| 5,572,403 | 11/1996 | Mills | 361/695 |
| 5,577,205 | 11/1996 | Hwang et al. . | |
| 5,579,487 | 11/1996 | Meyerson et al. | 395/280 |
| 5,579,491 | 11/1996 | Jeffries et al. . | |
| 5,579,528 | 11/1996 | Register | 395/671 |
| 5,581,712 | 12/1996 | Herrman . | |
| 5,581,714 * | 12/1996 | Amini et al. | 395/308 |
| 5,584,030 | 12/1996 | Husak et al. | 395/750 |
| 5,586,250 | 12/1996 | Carbonneau et al. | 395/183.2 |
| 5,588,121 | 12/1996 | Reddin et al. | 395/200.15 |
| 5,588,144 | 12/1996 | Inoue et al. . | |
| 5,592,610 | 1/1997 | Chittor | 395/182.02 |
| 5,592,611 | 1/1997 | Midgely et al. | 395/182.02 |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,604,873 | 2/1997 | Fite et al. | 395/283 |
| 5,606,672 | 2/1997 | Wade . | |
| 5,608,876 | 3/1997 | Cohen et al. . | |
| 5,615,207 | 3/1997 | Gephardt et al. . | |
| 5,621,159 | 4/1997 | Brown et al. | 73/9 |
| 5,621,892 | 4/1997 | Cook | 395/200.1 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,628,028 | 5/1997 | Michelson | 395/825 |
| 5,630,076 | 5/1997 | Saulpaugh et al. | 395/284 |
| 5,631,847 | 5/1997 | Kikinis | 364/514 R |
| 5,632,021 * | 5/1997 | Jennings et al. | 395/309 |
| 5,636,341 | 6/1997 | Matsushita et al. | 395/182.11 |
| 5,638,289 | 6/1997 | Yamada et al. . | |
| 5,644,470 | 7/1997 | Benedict et al. . | |
| 5,644,731 | 7/1997 | Liencres et al. . | |
| 5,651,006 | 7/1997 | Fujino et al. . | |
| 5,652,832 | 7/1997 | Kane et al. . | |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,081 | 8/1997 | Bonnell et al. . | |
| 5,655,083 | 8/1997 | Bagley | 395/182.31 |
| 5,655,148 | 8/1997 | Richman et al. . | |

| Patent No. | Date | Inventor | Class |
|---|---|---|---|
| 5,659,682 | 8/1997 | Devarakonda et al. . | |
| 5,664,118 | 9/1997 | Nishigaki et al. | 395/283 |
| 5,664,119 | 9/1997 | Jeffries et al. . | |
| 5,666,538 | 9/1997 | DeNicola . | |
| 5,668,943 | 9/1997 | Attanasio et al. | 395/182.05 |
| 5,668,992 | 9/1997 | Hammer et al. | 395/651 |
| 5,669,009 | 9/1997 | Buktenica et al. | 395/800.35 |
| 5,671,371 | 9/1997 | Kondo et al. | 395/306 |
| 5,675,723 | 10/1997 | Ekrot et al. . | |
| 5,680,288 | 10/1997 | Carey et al. . | |
| 5,684,671 | 11/1997 | Hobbs et al. . | |
| 5,689,637 | 11/1997 | Johnson et al. . | |
| 5,696,895 | 12/1997 | Hemphill et al. | 395/182.02 |
| 5,696,899 | 12/1997 | Kalwitz . | |
| 5,696,949 * | 12/1997 | Young | 713/400 |
| 5,696,970 | 12/1997 | Sandage et al. . | |
| 5,701,417 | 12/1997 | Lewis et al. | 395/200.16 |
| 5,704,031 | 12/1997 | Mikami et al. | 395/182.02 |
| 5,708,775 | 1/1998 | Nakamura | 395/185.01 |
| 5,708,776 | 1/1998 | Kikinis | 395/185.08 |
| 5,712,754 | 1/1998 | Sides et al. | 361/58 |
| 5,715,456 | 2/1998 | Bennett et al. | 395/652 |
| 5,717,570 | 2/1998 | Kikinis | 361/685 |
| 5,721,935 | 2/1998 | DeSchepper et al. | 395/750 |
| 5,724,529 | 3/1998 | Smith et al. . | |
| 5,726,506 | 3/1998 | Wood . | |
| 5,727,207 | 3/1998 | Gates et al. | 395/651 |
| 5,732,266 | 3/1998 | Moore et al. | 395/651 |
| 5,737,708 | 4/1998 | Grob et al. | 455/557 |
| 5,740,378 | 4/1998 | Rehl et al. . | |
| 5,742,514 | 4/1998 | Bonola | 364/492 |
| 5,742,833 | 4/1998 | Dea et al. | 395/750.05 |
| 5,747,889 | 5/1998 | Raynham et al. . | |
| 5,748,426 | 5/1998 | Bedingfield et al. . | |
| 5,752,164 | 5/1998 | Jones | 455/33.1 |
| 5,754,396 | 5/1998 | Felcman et al. | 361/683 |
| 5,754,449 | 5/1998 | Hoshal et al. | 364/550 |
| 5,754,797 | 5/1998 | Takahashi . | |
| 5,758,165 | 5/1998 | Shuff | 395/712 |
| 5,758,352 | 5/1998 | Reynolds et al. | 707/200 |
| 5,761,033 | 6/1998 | Wilhelm . | |
| 5,761,045 | 6/1998 | Olson et al. . | |
| 5,761,085 | 6/1998 | Giorgio | 364/505 |
| 5,761,462 * | 6/1998 | Neal et al. | 395/309 |
| 5,761,707 | 6/1998 | Aiken et al. | 711/118 |
| 5,764,924 | 6/1998 | Hong | 395/281 |
| 5,764,968 | 6/1998 | Ninomiya . | |
| 5,765,008 | 6/1998 | Desai et al. . | |
| 5,765,198 | 6/1998 | McCrocklin et al. . | |
| 5,767,844 | 6/1998 | Stoye | 345/212 |
| 5,768,541 | 6/1998 | Pan-Ratzlaff . | |
| 5,768,542 | 6/1998 | Enstrom et al. . | |
| 5,771,343 | 6/1998 | Hafner et al. | 395/182.02 |
| 5,774,645 | 6/1998 | Beaujard et al. | 395/183.01 |
| 5,774,741 | 6/1998 | Choi . | |
| 5,777,897 | 7/1998 | Giorgio | 364/557 |
| 5,778,197 | 7/1998 | Dunham | 395/284 |
| 5,781,703 | 7/1998 | Desai et al. . | |
| 5,781,716 | 7/1998 | Hemphill et al. | 395/182.02 |
| 5,781,744 | 7/1998 | Johnson et al. | 395/283 |
| 5,781,767 | 7/1998 | Inoue et al. . | |
| 5,781,798 | 7/1998 | Beatty et al. . | |
| 5,784,555 | 7/1998 | Stone | 395/200.5 |
| 5,784,576 | 7/1998 | Guthrie et al. . | |
| 5,787,019 | 7/1998 | Knight et al. | 364/550 |
| 5,787,459 | 7/1998 | Stallmo et al. | 711/112 |
| 5,787,491 | 7/1998 | Merkin et al. | 711/173 |
| 5,790,775 | 8/1998 | Marks et al. | 395/182.07 |
| 5,790,831 | 8/1998 | Lin et al. . | |
| 5,793,948 | 8/1998 | Asahi et al. | 395/184.01 |
| 5,793,987 | 8/1998 | Quackenbush et al. . | |
| 5,794,035 | 8/1998 | Golub et al. . | |
| 5,796,185 | 8/1998 | Takata et al. . | |
| 5,796,580 | 8/1998 | Komatsu et al. | 361/687 |
| 5,796,981 | 8/1998 | Abudayyeh et al. . | |
| 5,797,023 | 8/1998 | Berman et al. | 395/750.06 |
| 5,798,828 | 8/1998 | Thomas et al. . | |
| 5,799,036 | 8/1998 | Staples . | |
| 5,799,196 | 8/1998 | Flannery | 395/750.03 |
| 5,801,921 | 9/1998 | Miller . | |
| 5,802,269 | 9/1998 | Poisner et al. . | |
| 5,802,298 | 9/1998 | Imai et al. | 395/200.47 |
| 5,802,305 | 9/1998 | McKaughan et al. | 395/200.57 |
| 5,802,324 | 9/1998 | Wunderlich et al. | 395/281 |
| 5,802,393 | 9/1998 | Begun et al. . | |
| 5,802,552 | 9/1998 | Fandrich et al. . | |
| 5,802,592 | 9/1998 | Chess et al. | 711/164 |
| 5,803,357 | 9/1998 | Lakin | 236/78 B |
| 5,805,804 | 9/1998 | Laursen et al. | 395/200.02 |
| 5,805,834 | 9/1998 | McKinley et al. . | |
| 5,809,224 | 9/1998 | Schultz et al. . | |
| 5,809,256 | 9/1998 | Najemy | 395/283 |
| 5,809,287 | 9/1998 | Stupek, Jr. et al. | 395/500 |
| 5,809,311 | 9/1998 | Jones | 395/750.01 |
| 5,809,555 | 9/1998 | Hobson | 711/172 |
| 5,812,748 | 9/1998 | Ohran et al. | 395/182.02 |
| 5,812,750 | 9/1998 | Dev et al. . | |
| 5,812,757 | 9/1998 | Okamoto et al. . | |
| 5,812,858 | 9/1998 | Nookala et al. . | |
| 5,815,117 | 9/1998 | Kolanek . | |
| 5,815,647 | 9/1998 | Buckland et al. | 395/182.01 |
| 5,815,652 | 9/1998 | Ote et al. . | |
| 5,821,596 | 10/1998 | Miu et al. | 257/419 |
| 5,822,547 | 10/1998 | Boesch et al. . | |
| 5,826,043 | 10/1998 | Smith et al. | 395/281 |
| 5,835,719 | 11/1998 | Gibson et al. | 395/200.51 |
| 5,835,738 * | 11/1998 | Blackledge, Jr. et al. | 395/307 |
| 5,838,932 | 11/1998 | Alzien | 395/308 |
| 5,841,964 | 11/1998 | Yamaguchi | 395/113.21 |
| 5,841,991 | 11/1998 | Russell . | |
| 5,845,061 | 12/1998 | Miyamoto et al. | 395/182.02 |
| 5,845,095 | 12/1998 | Reed et al. | 395/283 |
| 5,850,546 | 12/1998 | Kim | 395/651 |
| 5,852,720 | 12/1998 | Gready et al. . | |
| 5,852,724 | 12/1998 | Glenn, II et al. | 395/200.69 |
| 5,857,074 | 1/1999 | Johnson . | |
| 5,857,102 | 2/1999 | McChesney et al. | 395/653 |
| 5,864,653 | 1/1999 | Tavallaei et al. | 315/181 |
| 5,864,713 | 1/1999 | Terry | 395/872 |
| 5,867,730 | 2/1999 | Leyda | 395/830 |
| 5,875,307 | 2/1999 | Ma et al. | 395/281 |
| 5,875,308 | 2/1999 | Egan et al. | 395/283 |
| 5,875,310 | 2/1999 | Buckland et al. | 395/306 |
| 5,878,237 * | 3/1999 | Olarig | 710/128 |
| 5,878,238 * | 3/1999 | Gan et al. | 710/12 |
| 5,881,311 | 3/1999 | Woods | 395/824 |
| 5,884,027 | 3/1999 | Garbus et al. | 395/200.8 |
| 5,884,049 | 3/1999 | Atkinson | 395/281 |
| 5,886,424 | 3/1999 | Kim | 307/64 |
| 5,889,965 | 3/1999 | Wallach et al. | 395/283 |
| 5,892,898 | 4/1999 | Fujii et al. | 395/185.1 |
| 5,892,928 * | 4/1999 | Wallach et al. | 710/103 |
| 5,898,846 | 4/1999 | Kelly | 395/284 |
| 5,898,888 | 4/1999 | Guthrie et al. | 395/308 |
| 5,905,867 | 5/1999 | Giorgio | 395/200.54 |
| 5,907,672 | 5/1999 | Matze et al. | 395/182.06 |
| 5,909,568 | 6/1999 | Nason | 395/500 |
| 5,911,779 | 6/1999 | Stallmo et al. | 714/6 |
| 5,913,034 | 6/1999 | Malcolm | 395/200.53 |
| 5,922,060 * | 7/1999 | Goodrum | 710/103 |
| 5,930,358 | 7/1999 | Rao | 380/4 |
| 5,935,262 | 8/1999 | Barrett et al. | 714/46 |

| | | | |
|---|---|---|---|
| 5,936,960 | 8/1999 | Stewart | 370/438 |
| 5,938,751 | 8/1999 | Tavallaei et al. | 710/103 |
| 5,941,996 | 8/1999 | Smith et al. | 714/47 |
| 5,964,855 | 10/1999 | Bass et al. | 710/103 |
| 5,983,349 | 11/1999 | Kodama et al. | 713/200 |
| 5,987,554 | 11/1999 | Liu et al. | 710/129 |
| 5,987,627 | 11/1999 | Rawlings, III | 714/48 |
| 6,012,130 | 1/2000 | Beyda et al. | 711/173 |
| 6,038,624 | 3/2000 | Chan et al. | 710/103 |

OTHER PUBLICATIONS

Compaq Computer Corporation, Phenix Technologies, LTD, and Intel Corporation, specification, 55 pages, May 5, 1995, "Plug & Play BIOS Specification."

NetFrame Systems Incorporated, datasheet, 2 pages, Feb. 1996, "NF450FT Network Mainframe."

NetFrame Systems Incorporated, datasheet, 9 pages, Mar. 1996, "NetFrame Cluster Server 8000."

Joint work by Intel Corporation, Compaq, Adaptec, Hewlett Packard, and Novell, presentation, 22 pages, Jun. 1996, "Intelligent I/O Architecture."

Lockareff, M., HTINews, http://www.hometoys.com/htinews/dec96/articles/lonworks.htm, 2 pages, Dec. 1996, "Loneworks—An Introduction."

Schofield, M.J., http://www.omegas.co.uk/CAN/canworks.htm, 4 pages, Copyright 1996, 1997, "Controller Area Network—How Can Works."

NTRR, Ltd, http://www.nrtt.demon.co.uk/cantech.html, 5 pages, May 28, 1997, "Can: Technical Overview."

Herr, et al., Linear Technology Magazine, Design Features, pp. 21–23, Jun. 1997, "Hot Swapping the PCI Bus."

PCI Special Interest Group, specification, 35 pages, Draft For Review Only, Jun. 15, 1997, "PCI Bus Hot Plug Specification."

Microsoft Corporation, file:///A |/Rem_devs.htm, 4 pages, Copyright 1997, updated Aug. 13, 1997, "Supporting Removable Devices Under Windows and Windows NT."

Davis, T, Usenet post to alt.msdos.programmer, Apr. 1997, "Re: How do I create an FDISK batch file?".

Davis, T., Usenet post to alt.msdos.batch, Apr. 1997, "Re: Need help with automating FDISK and Format . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novel® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI Systems Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

ftp.cdrom.com/pub/os2/diskutil/, PHDX software, phdx.zip download, Mar. 1995, "Parallel Hard Disk Xfer."

Cmasters, Usenet post to microsoft.public.windowsnt.setup, Aug. 1997, "Re: FDISK switches."

Hildebrand, N., Usenet post to comp.msdos.programmer, May. 1995, "Re: Structure of disk partition into."

Lewis, L., Usenet post to alt.msdos.batch, Apr. 1997, "Re: Need help with automating FDISK and Format."

Netframe, http://www.netframe–support.com/technology/datasheets/data.htm, before Mar. 1997, "Netframe Cluster-System 9008 Data Sheet."

Simos, M., Usenet post to comp.os.msdos.misc, Apr. 1997, "Re: Auto FDISK and Format."

Wood, M. H., Usenet post to comp.os.netware.misc, Aug. 1996, "Re: Workstation duplication method for WIN95."

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulliten, 92A+62947, pp. 391–394, Oct. 1992, Method for Card Hot Plug Detection and Control.

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFrame."

Rigney, PC Magazine, 14(17): 375–379, Oct. 10, 1995, "The One for the Road (Mobile–aware capabilities in Windows 95)."

PCI System Architecture, Shanley, 1995, pp. 304, 312, 384.*

* cited by examiner

SYSTEM FOR EXPANDING PCI BUS LOADING CAPACITY

RELATED APPLICATIONS

The subject matter of U.S. patent application entitled METHOD OF EXPANDING PCI BUS LOADING CAPACITY, filed on Oct. 1, 1997, application Ser. No. 08/942,223, and is related to this application.

PRIORITY CLAIM

The benefit under 35 U.S.C. § 119(e) of the following U.S. provisional application(s) is hereby claimed:

| Title | Application No. | Filing Date |
| --- | --- | --- |
| "Hardware and Software Architecture for for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |
| "Isolated Interrupt Structure for Input/Output Architecture" | 60/047,003 | May 13, 1997 |
| "Three Bus Server Architecture with a Legacy PCI Bus and Mirrored I/O PCI Buses" | 60/046,490 | May 13, 1997 |
| "Computer System Hardware Infrastructure for Hot Plugging Single and Multi-Function PC Cards Without Embedded Bridges" | 60/046,398 | May 13, 1997 |
| "Computer System Hardware Infrastructure for Hot Plugging Multi-Function PCI Cards With Embedded Bridges" | 60/046,312 | May 13, 1997 |

APPENDICES

Appendix A, which forms a part of this disclosure, is a list of commonly owned copending U.S. patent applications. Each one of the applications listed in Appendix A is hereby incorporated herein in its entirety by reference thereto.

Appendix B, which forms part of this disclosure, is a copy of the U.S. provisional patent application filed May 13, 1997, entitled "ISOLATED INTERRUPT STRUCTURE FOR INPUT/OUTPUT ARCHITECTURE" and assigned Application Ser. No. 60/047,003. Page 1, line 17 of the provisional application has been changed from the original to positively recite that the entire provisional application, including the attached documents, forms part of this disclosure.

Appendix C, which forms part of this disclosure, is a copy of the U.S. provisional patent application filed May 13, 1997, entitled "THREE BUS SERVER ARCHITECTURE WITH A LEGACY PCI BUS AND MIRRORED I/O PCI BUSES" and assigned application Ser. No. 60/046,490. Page 1, line 15 of the provisional application has been changed from the original to positively recite that the entire provisional application, including the attached documents, forms part of this disclosure.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates generally to information processing systems, such as computer servers and personal computers (PCs). More particularly, this invention relates to the transfer of control and data signals within an information processing system having multiple bus architecture.

2. Description of the Related Art

Information processing systems, such as personal computers (PCs), have virtually become an inseparable part of everyone's daily activities. These systems process an enormous amount of information in a relatively short time. To perform these sophisticated tasks, the computer system typically includes a microprocessor, memory modules, various system and bus control units, and a wide variety of data input/output (I/O) and storage devices. These computer components communicate information using various data rates and protocols over multiple system buses. The demand for faster processing speeds, and the revolutionary fast-track development of computer systems, have necessitated the use of interconnecting devices. These devices act as bridges among various data transfer protocols within the computer system. One example of such interconnecting devices is the peripheral component interconnect (PCI) bridge.

The PCI Local Bus Specification, Revision 2.1 ("PCI Specification") defines a PCI Local Bus with the primary goal of establishing an industry standard. The PCI Local Bus is a 32-bit or 64-bit bus with multiplexed address and data lines. The bus is intended for use as an interconnect mechanism between highly integrated peripheral controller components, peripheral add-in boards, and processor/memory systems. The PCI Specification includes the protocol, electrical, mechanical, and configuration specification for PCI Local Bus components and expansion boards. The electrical definition provides for 5.0V (e.g., desktop PCs) and 3.3V (e.g., mobile PCs) signaling environments.

Figure 1:
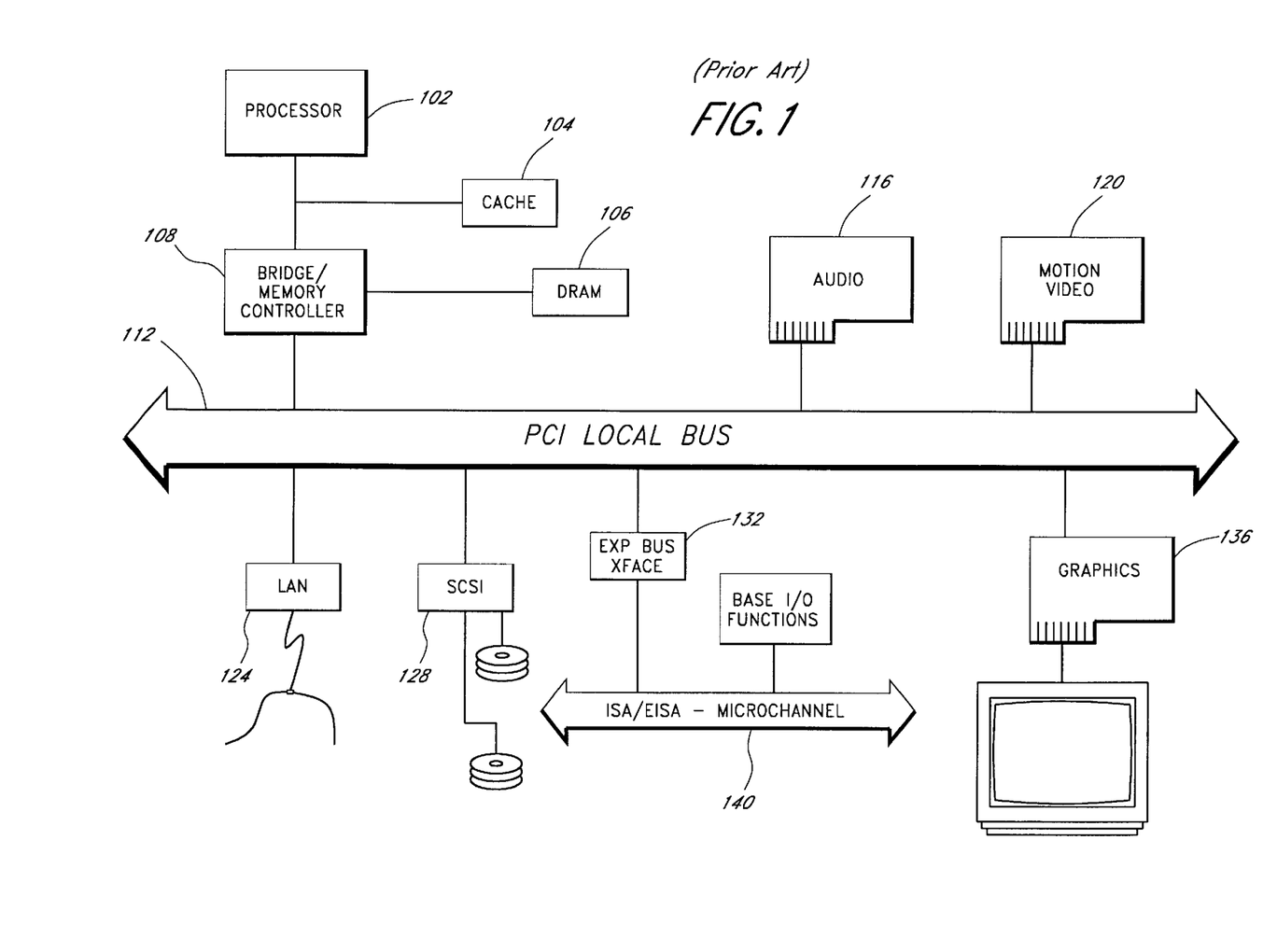
FIG. 1 is a block diagram of a conventional PCI local bus architecture in a computer system.

Typical PCI Local Bus implementations support up to four add-in boards. An add-in board is a circuit board that plugs into a motherboard and provides added functionality. The motherboard is the main circuit board which contains the basic function (e.g., a central processing unit or CPU, I/O, and expansion connectors) of a computer system. FIG. 1 shows a typical PCI Local Bus system architecture. As shown in FIG. 1, a processor 102, a cache 104, and a dynamic random access memory (DRAM) 106 are connected to a PCI Local Bus 112 through a PCI Bridge 108. The PCI Bridge 108 provides the logic that connects one bus to another to allow an agent (i.e., an entity that operates on a computer bus) on one bus to access an agent on the other. The PCI Bridge 108 provides a low latency path through which the processor 102, the cache 104, and DRAM 106 may directly access PCI devices mapped anywhere in the memory or I/O address spaces. Typical PCI devices include an audio card 116, a motion video card 120, a local area network (LAN) interface 124, a small computer system interface (SCSI) 128, an expansion bus interface 132, and a graphics card 136. The expansion bus interface 132 typically connects industry standard architecture (ISA) and extended ISA (EISA) devices (not shown in this figure) to the PCI local bus 112 via an ISA, EISA, or MicroChannel 140. The expansion bus interface 132 is often referred to as the ISA/EISA bridge.

PCI bus drivers spend a relatively large portion of time in transient switching. PCI bus drivers are specified in terms of their AC switching characteristics. Specifically, the voltage to current relationship (V/I curve) of the driver through its active switching range is the primary means of specification. The PCI Specification defines that PCI bus drivers achieve acceptable AC switching behavior in typical configurations of six loads on the motherboard and two expansion connectors (each is considered as two loads). The PCI bus drivers can also achieve acceptable switching behavior in configurations of two loads on the mother board and four expansion connectors. Hence, the loading capacity on the PCI Local Bus 112 is limited to ten loads. In practice, however, a standard PCI configuration uses a Processor-to-PCI bridge to generate the PCI bus with up to four card slots thereon. Violation of expansion board trace length or loading limits may compromise system signal integrity.

The foregoing loading limits have imposed serious restrictions on system designers, and prevented the addition of new functions to computer systems. Several attempts have been made to increase the loading capacity of a PCI bus. One approach involves implementing a Processor-to-PCI bridge by coupling it to a local processor bus (i.e., the bus to which the CPU is connected). The Processor-to-PCI bridge provides a connection between the local processor bus and a PCI bus. As noted above, the loading capacity of such a PCI Chipset bridge, however, is limited to four card slots. With the increasing performance demands on personal computers, such load capacity remains insufficient. Accordingly, there is a need in the technology to expand the loading capacity of a PCI bus. Such expansion of loading capacity ensures the demands of adding powerful features to already overburdened information processing systems can be met.

SUMMARY OF THE INVENTION

To overcome the limitations of the related art, the invention provides a system for expanding the loading capacity of a PCI bus beyond its maximum loading capacity. The invention fully complies with the PCI Specification and does not compromise the system signal integrity.

According to one embodiment of the invention, a PCI bridge system for expanding the loading capacity of a PCI bus is provided. The PCI bridge system allows the expansion of the loading capacity of a PCI bus up to sixteen add-in board connectors ("card slots"). In this embodiment, a first-to-second bridge (e.g., the "processor-to-PCI bridge") connects a local processor bus to four second-to-third bridges (e.g., the "PCI-to-PCI bridges"). Each PCI-to-PCI bridge supports up to four PCI card slots via its unique PCI bus. Hence, the PCI bridge system results in expanding the PCI bus to sixteen card slots without violating the loading capacity or signal integrity of the system.

In another embodiment of the invention, two or more processor-to-PCI bridges are integrated with the local processor bus. Each processor-to-PCI bridge connects the local processor bus to four PCI-to-PCI bridges via its unique PCI bus. Each PCI-to-PCI bridge supports up to four PCI card slots via its unique PCI bus. A third processor-to-PCI bridge is connected to the local processor bus to function as a compatibility bridge. The implementation of two processor-to-PCI bridges in a symmetric architecture adds redundancy and fault tolerance characteristics to the system. Additionally, any system breakdowns due to single-point failures is minimized.

BRIEF DESCRIPTION OF THE INVENTION

The above and other aspects, features and advantages of the invention will be better understood by referring to the following detailed description, which should be read in conjunction with the accompanying drawings, in which.

DETAILED DESCRIPTION OF THE INVENTION

Figure 2:
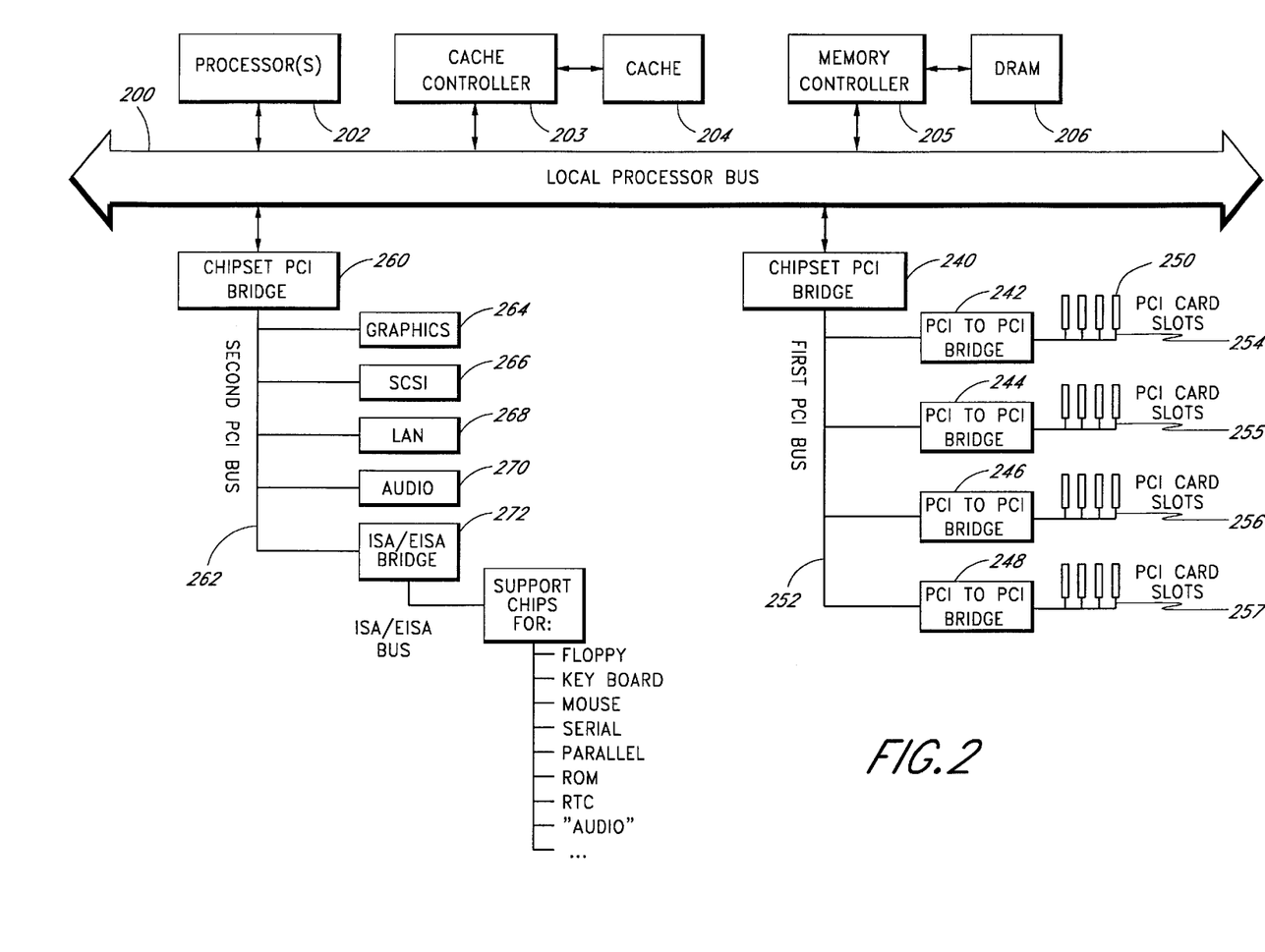
FIG. 2 is a block diagram of a local processor bus architecture implemented according to one embodiment of the invention.

The invention provides a system for expanding the loading capacity of a PCI bus in an information processing system (the "computer system"). In a first embodiment, the invention provides a system for expanding the loading capacity of a PCI bus up to sixteen card slots. FIG. 2 shows a block diagram of a local processor bus architecture implemented in this first embodiment. As shown in FIG. 2, a Local Processor Bus 200 is provided to support the transfer of control and data signals among various devices within a computer system. In this embodiment, one or more processor 202 is connected to the Local Processor Bus 200 to communicate with the other devices installed within the computer system. A Cache 204 is coupled to a Cache Controller 203 which is connected to the Local Processor Bus 200. Dynamic random access memory (DRAM) 206 is coupled to a Memory Controller 205 which is connected to the Local Processor Bus 200.

A Chipset PCI Bridge 240 is connected to the Local Processor Bus 200 to provide access by a variety of PCI devices on a First PCI Bus 252 to the Local Processor Bus 200. The Chipset PCI Bridge 240 generates the First PCI Bus 252 when connected to the Local Processor Bus 200. Another Chipset PCI Bridge 260 is coupled to the Local Processor Bus 200 as a "compatibility bridge." The Chipset PCI Bridge 260 generates a Second PCI Bus 262 when connected to the Local Processor Bus 200. The Chipset PCI Bridge 260 is a compatibility bridge because compatibility devices of a personal computer (PC) are located on its Second PCI Bus 262. With this configuration, the Chipset PCI Bridge 240 "knows" that it is a non-compatibility bridge and initializes itself with different power-on default values compared to the Chipset PCI Bridge 260. The two Chipset PCI Bridges 240 and 260 are considered peers at the host level. A chipset PCI bridge may be based on the 82450/82454 family of PCI Chipsets manufactured by Intel Corporation.

Four PCI-to-PCI Bridges 242, 244, 246, and 248, are connected to the First PCI Bus 252 to provide access to the Local Processor Bus 200 via the Chipset PCI Bridge 240. Each PCI-to-PCI Bridge (242, 244, 246, and 248) fully complies with the PCI Specification, and has full support for delayed transactions, which enables the buffering of memory read, I/O, and configuration transactions. Each PCI-to-PCI Bridge (242, 244, 246, and 248) provides a connection between two independent PCI buses. The first independent bus is the First PCI Bus 252 which is common to all the PCI-to-PCI bridges. The First PCI Bus 252 is often referred to as the primary PCI bus in view of its close proximity to the processor 202. Each PCI-to-PCI bridge has its unique secondary PCI bus. The unique four PCI buses are the Secondary PCI Buses 254, 255, 256, and 257. These PCI buses are secondary PCI buses because they are farthest from the Local Processor Bus 200.

Each PCI-to-PCI Bridge (242, 244, 246, and 248) supports buffering of simultaneous multiple posted write and delayed transactions in both directions. Each PCI-to-PCI Bridge (242, 244, 246, and 248) allows the Local Processor Bus 200 and each of its respective Secondary PCI Buses (254, 255, 256, and 257) to operate concurrently. A master and target on the same PCI bus may communicate while the other PCI bus is busy. The term "target" refers to a device on the PCI bus which responds with a positive acknowledgement to a bus transaction initiated by a master.

If its internal arbiter is used, each of the PCI-to-PCI Bridges (242, 244, 246, and 248) supports up to four PCI bus master devices on its respective Secondary PCI Bus (254, 255, 256, and 257). Four add-in board connectors 250 (the "PCI Card Slots") are connected to each of the Secondary PCI Buses 254, 255, 256, and 257, to provide access of PCI devices to the Local Processor Bus 200. The connector that supports each PCI Card Slot 250 is derived from a Micro Channel (MC)-style connector. MC systems are based on an architecture expansion bus defined by IBM for its PS/2 line of personal computers. The same PCI expansion board can be used in an ISA-, EISA-, and MC-based systems, provided that the motherboard supports PCI card slots in combination with ISA, EISA, and MC card slots. PCI expansion cards use an edge connector and motherboards that allow a female connector be mounted parallel to the system bus connectors. To provide a quick and easy transition from 5.0V to 3.3V component technology, there are two types of add-in board connectors: one for the 5.0V signaling environment and one for the 3.3V signaling environment.

Arbitration is provided to coordinate data transfers among PCI devices installed in the PCI Card Slots 250. On the primary bus, the Chipset PCI Bridge 240, or an independent arbiter (not shown in this figure), arbitrates the use of the First PCI Bus 252 when forwarding upstream transactions. On a secondary bus, each PCI-to-PCI bridge, or an independent arbiter (not shown in this figure), arbitrates for use of its respective secondary PCI bus for the downstream transactions. The arbiter for the primary bus may reside on the motherboard (not shown in this figure) which is external to the PCI Chipset Bridge 240. For each secondary PCI bus, each PCI-to-PCI bridge implements an internal arbiter (not shown in this figure). If desired, this arbiter may be disabled, and an external arbiter may be used instead. The PCI-to-PCI bridge may be based on the chips 21050/21152 PCI-to-PCI Bridges manufactured by Digital Equipment Corporation.

As noted above, the Chipset PCI Bridge 260 operates as a compatibility bridge. It generates a Second PCI Bus 262 when connected to the Local Processor Bus 200. As a compatibility bridge, typical PC devices may be connected to its Second PCI Bus 262 to access devices which are resident on the Local Processor Bus 200. Typical personal computer PCI devices may include a graphics interface 264, a SCSI 266, a LAN interface 268, an audio interface 270, and an ISA/EISA bridge 272. The ISA/EISA bridge connects industry standard architecture (ISA) extended ISA (EISA) devices (not shown in this figure) to the Local Processor Bus 200. These ISA devices may include a floppy drive, a key board, a mouse, a serial port, a parallel port, a read only memory (ROM) unit, a real-time clock (RTC), and an audio interface.

Figure 3:
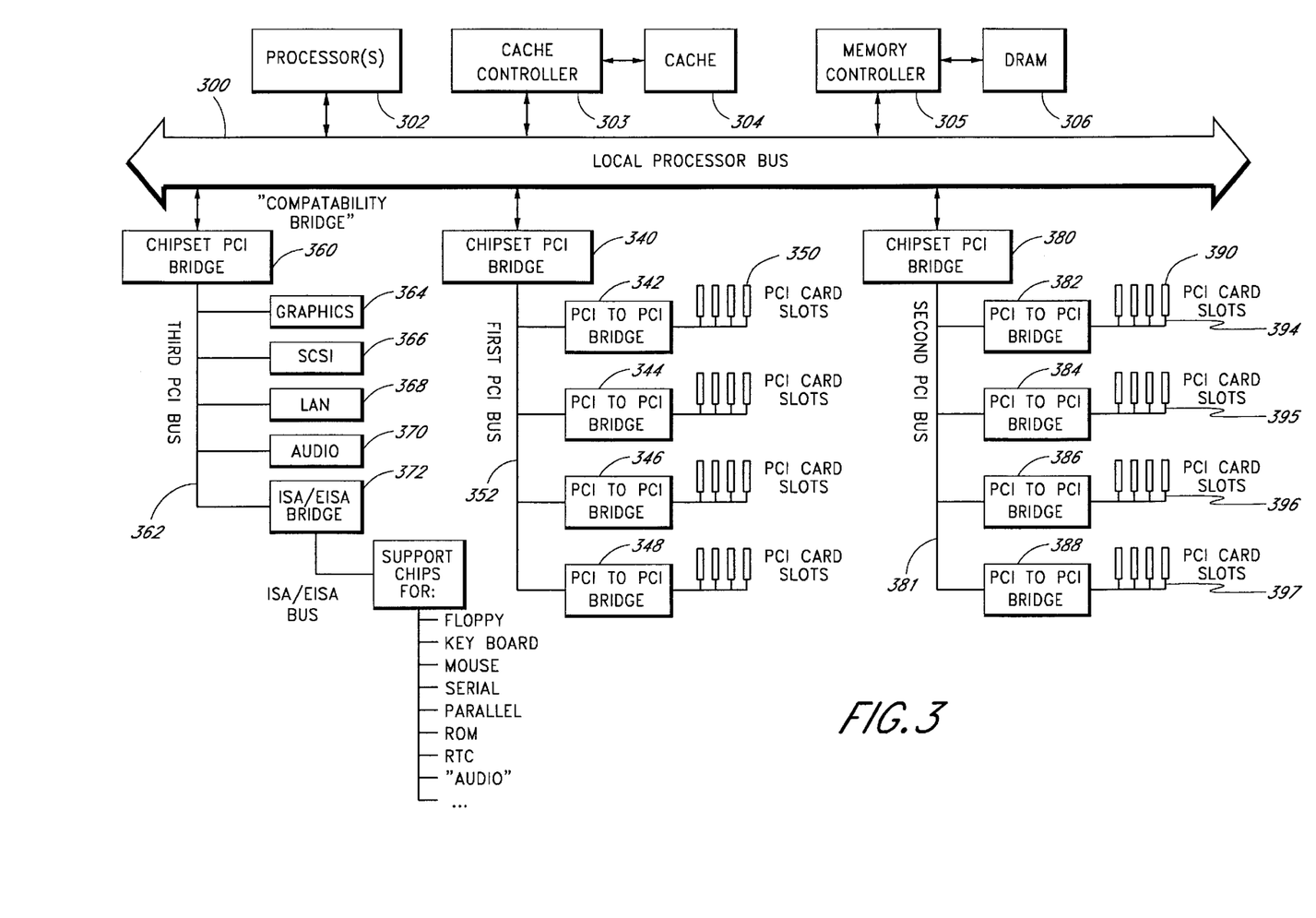
FIG. 3 is a block diagram of a local processor bus architecture implemented according to another embodiment of the invention.

Referring now to FIG. 3, a block diagram of a PCI bus architecture implemented as a second embodiment of the invention is shown. As shown in FIG. 3, a Local Processor Bus 300 is provided to support the transfer of control and data signals among various devices within a computer system. In this embodiment, one or more processor 302 is connected to the Local Processor Bus 300 to communicate with the other devices installed within the computer system. A Cache 304 is coupled to a Cache Controller 303 which is connected to the Local Processor Bus 300. A dynamic random access memory (DRAM) 306 is coupled to a Memory Controller 305 which is connected to the Local Processor Bus 300.

A Chipset PCI Bridge 340 is connected to the Local Processor Bus 200 to provide access by a variety of PCI devices on a First PCI Bus 352 to the Local Processor Bus 300. Similarly, another Chipset PCI Bridge 360 is connected to the Local Processor Bus 200 to provide access by a variety of PCI devices on a Second PCI Bus 381 to the Local Processor Bus 300. A third Chipset PCI Bridge 360 is coupled to the Local Processor Bus 300 as a "compatibility bridge."0 The Chipset PCI Bridge 360 generates a Third PCI Bus 362 when connected to the Local Processor Bus 300. The Chipset PCI Bridge 360 is a compatibility bridge because compatibility devices of a personal computer (PC) are located on its Third PCI Bus 362. The Chipset PCI Bridge 360 interconnects PCI devices and an ISA/EISA bridge in the same manner described in FIG. 2.

Four PCI-to-PCI Bridges 342, 344, 346, and 348, are connected to the First PCI Bus 352, and another four PCI-to-PCI Bridges 382, 384, 386, and 388, are connected to the Second PCI Bus 381. The Chipset PCI Bridge 340 provides the PCI-to-PCI Bridges 342, 344, 346, and 348, with access to the Local Processor Bus 300. Similarly, the Chipset PCI Bridge 380 provides the PCI-to-PCI Bridges 382, 384, 386, and 388, with access to the Local Processor Bus 300. The specifications of each PCI-to-PCI Bridge (342, 344, 346, 348, 382, 384, 386, and 388) are similar to the specifications of the PCI-to-PCI Bridges 242, 244, 246, and 248 described in FIG. 2. Each of the PCI-to-PCI Bridges (342, 344, 346, and 348) provides a connection between two independent PCI buses. The first independent bus is the First PCI Bus 352 which is common to all these PCI-to-PCI bridges. The First PCI Bridge 352 is often referred to as the primary PCI bus in view of its close proximity to the processor 302. Similarly, each of the PCI-to-PCI Bridges (382, 384, 386, and 388) provides a connection between two independent PCI buses. The first independent bus is common to all these PCI-to-PCI bridges: Second PCI Bus 381 which is referred to as the primary PCI bus in view of its close proximity to the Local Processor Bus 300. Each PCI-to-PCI bridge has its unique secondary PCI bus. A first set of unique PCI buses is the Secondary PCI Buses 354, 355, 356, and 357. These PCI buses are secondary PCI buses because they are farthest from the Local Processor Bus 300. A second set of unique PCI buses is the Secondary PCI Buses 394, 395, 396, and 397. These PCI buses are secondary PCI buses because they are farthest from the Local Processor Bus 300.

Each of the PCI-to-PCI Bridges (342, 344, 346, 348, 382, 384, 386, and 388) supports up to four PCI bus master devices on its respective Secondary PCI Bus (354, 355, 356, 357, 394, 395, 396, and 397). Each of the Secondary PCI Buses 354, 355, 356, and 357, supports four add-in board connectors 350 (the "PCI Card Slots") to provide access for PCI devices to the Local Processor Bus 300. Similarly, each of the Secondary PCI Buses 394, 395, 396, and 397 supports four add-in board connectors 390 (the "PCI Card Slots") to provide access for PCI devices to the Local Processor Bus 300. The specifications of each PCI Card Slot 350 and 390 are preferably similar to the specifications of the PCI Card Slots 250 described in FIG. 2. Arbitration is provided to coordinate data transfers among PCI devices in the same manner described in FIG. 2.

The PCI architecture of each of the Chipset PCI Bridge 340 and 380 may optionally be identical to or different from the other. More particularly, if the PCI Card Slots 350 and 390 are supporting substantially identical PCI devices, a substantially symmetric PCI bridge architecture is achieved. A key advantage of such a symmetric architecture includes the redundant or fault-tolerant characteristic of a PCI signal path. For instance, if the Chipset PCI Bridge 340 fails, or any or all of its PCI-to-PCI bridges fail, the availability of the Chipset PCI Bridge 380 ensures access between the PCI Card Slots 390 and the Local Processor Bus 300. Similarly, if the Chipset PCI Bridge 380 fails, or any or all of its PCI-to-PCI bridges fail, the availability of the Chipset PCI Bridge 340 ensures access between the PCI Card Slots 350 and the Local Processor Bus 300. Moreover, in view of the availability of an alternative signal path between PCI devices and the Local Processor Bus 300, the possibility of a single-point failure is minimized. A single-point failure is defined as a failure occurring at a single point in the system wherebecause the entire system fails.

From the standpoint of the Local Processor Bus 300, the loading of each of the Chipset PCI Bridges 340, 360, and 380 with all its supported PCI devices are considered one load. Using this PCI bridge architecture, the loading capacity of the Local Processor Bus 312 is not violated. More importantly, the sharing of the PCI signals among the newly created thirty-two PCI Card Slots 350 and 390 does not compromise the system signal integrity.

In view of the foregoing, it will be appreciated that the invention overcomes the longstanding need for expanding the loading capacity of a PCI bus without the disadvantages of compromising system signal integrity. The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. In a computer system having a host, first, second, third, and fourth bus, a bus-to-bus bridge system comprising:
    a host-to-first bi-directional bridge connecting the host bus to the first bus;
    a host-to-second bi-directional bridge connecting the host bus to the second bus;
    a plurality of first-to-third bi-directional bridges connecting the first bus to the third bus;
    a plurality of second-to-fourth bi-directional bridges connecting the second bus to the fourth bus, wherein the plurality of first-to-third bi-directional bridges are configured to be symmetric to and perform substantially the same function as the plurality of second-to-fourth bi-directional bridges; and
    a plurality of board connectors coupled to each of the first-to-third and second-to-fourth bi-directional bridges via a plurality of respective buses.

2. The system as defined in claim 1, wherein each of said first and second buses is a peripheral component interconnect (PCI) bus.

3. The system as defined in claim 1, wherein each of said plurality of respective buses is a peripheral component interconnect (PCI) bus.

4. The system as defined in claim 1, wherein each of said host-to-first and host-to-second bi-directional bridges is a processor-to-PCI bridge.

5. The system as defined in claim 1, wherein said first-to-third and second-to-fourth bi-directional bridges is a PCI-to-PCI bridge.

6. The system as defined in claim 1, wherein said plurality of first-to-third bi-directional bridges comprises four first-to-third bi-directional bridges.

7. The system as defined in claim 1, wherein said plurality of second-to-fourth bi-directional bridges comprises four second-to-third bi-directional bridges.

8. The system as defined in claim 1, wherein said plurality of board connectors comprises four board connectors.

9. The system as defined in claim 1, wherein each of said plurality of respective buses is a peripheral component interconnect (PCI) bus.

10. The system as defined in claim 1, wherein each of said plurality of respective buses is coupled to either the first or second bus by a single first-to-third or a single second-to-fourth bi-directional bridge.

11. In a computer system having a host, first, and second bus, a bus-to-bus bridge system comprising:
    a host-to-first means for bi-directionally connecting the host bus to the first bus;
    a host-to-second means for bi-directionally connecting the host bus to the second bus;
    a plurality of first means for bi-directionally connecting the first bus to a first plurality of buses, wherein said first connecting means are coupled to said host-to-first connecting means via the first bus;
    a plurality of second means for bi-directionally connecting the second bus to a second plurality of buses, wherein said second connecting means are coupled to said host-to-second connecting means via the second bus, wherein the plurality of first connecting means are symmetric to and perform substantially the same function as the plurality of second connecting means; and
    a plurality of means for connecting each of the first and second plurality of buses to a plurality of boards.

12. The system as defined in claim 11, wherein each of said first and second buses is a peripheral component interconnect (PCI) bus.

13. The system as defined in claim 11, wherein each of said plurality of buses is a peripheral component interconnect (PCI) bus.

14. In a computer system having a first, second, and third bus, a bus-to-bus bridge system comprising:
    a first bus-to-bus bi-directional bridge connecting the first bus to the second bus;
    a first plurality of bus-to-bus bi-directional bridges connected to the second bus;
    a second bus-to-bus bi-directional bridge connecting the first bus to the third bus; and
    a second plurality of bus-to-bus bi-directional bridges connected to the third bus, wherein the first bus-to-bus bi-directional bridge and the first plurality of bus-to-bus bi-directional bridges are configured to be redundant to and perform substantially the same function as the second bus-to-bus bi-directional bridge and the second plurality of bus-to-bus bi-directional bridges.

15. The system as defined in claim 14, wherein the first bus-to-bus bi-directional bridge and second bus-to-bus bi-directional bridge support fault-tolerance functionality.

16. The system as defined in claim 14, wherein said system is configured such that if the first bus-to-bus bi-directional bridge fails, the second bus-to-bus bi-directional bridge maintains connectivity between the first bus and the third bus.

17. The system as defined in claim 14, wherein one of the first plurality of bus-to-bus bi-directional bridges supports a first board, and one of the second plurality of bus-to-bus bi-directional bridges supports a second board.

18. The system as defined in claim 17, wherein the first board is substantially similar to the second board.

19. The system as defined in claim 17, wherein the first board and second board are connected to a common device.

20. In a computer system having a processor bus, a first PCI bus, and a second PCI bus, a bus-to-bus bridge system comprising:

a first processor-PCI bi-directional bridge connecting the processor bus to the first PCI bus, a second processor-PCI bi-directional bridge connecting the processor bus to the second PCI bus;

four PCI-PCI bi-directional bridges connecting the first PCI bus to a first plurality of PCI buses;

four PCI-PCI bi-directional bridges connecting the second PCI bus to a second plurality of PCI buses; and a plurality of board connectors coupled to each of said first and second plurality of PCI buses so as to be symmetrical to and perform substantially the same function as.

21. The system as defined in claim 20, wherein said plurality of board connectors comprises four PCI board connectors.

22. The system as defined in claim 20, wherein each of the plurality of first and second PCI buses comprises four PCI buses.

* * * * *